Dec. 6, 1932.  E. E. CAMPBELL  1,890,028
DEMOUNTABLE RIM
Filed Jan. 21, 1930    2 Sheets-Sheet 1

Earl E. Campbell, Inventor

Dec. 6, 1932.     E. E. CAMPBELL     1,890,028
DEMOUNTABLE RIM
Filed Jan. 21, 1930     2 Sheets-Sheet 2
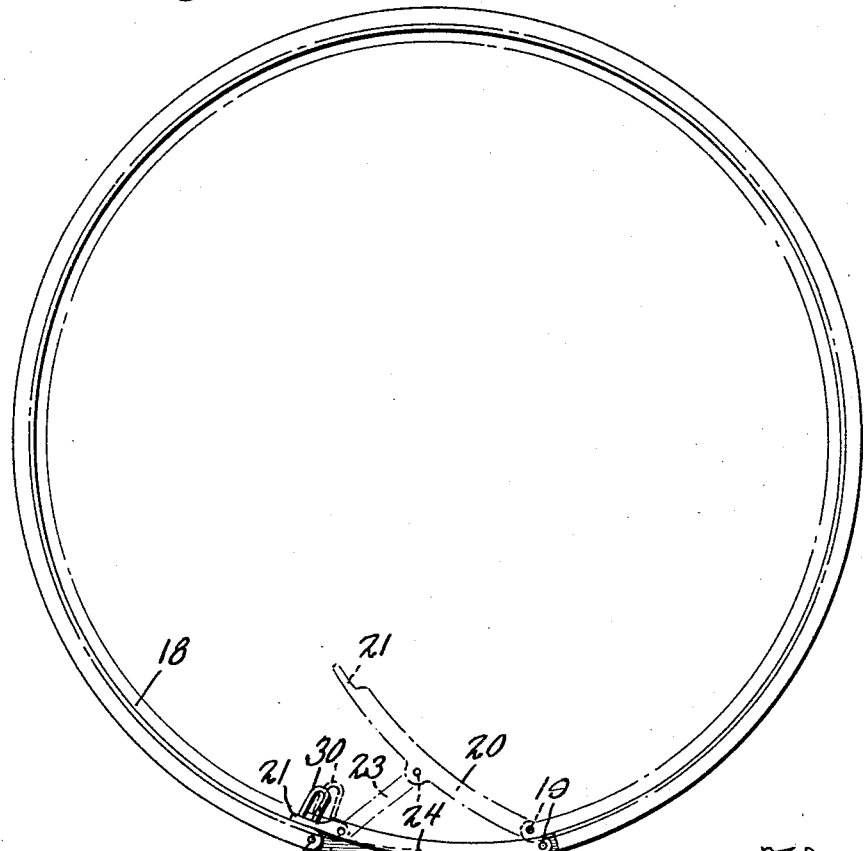
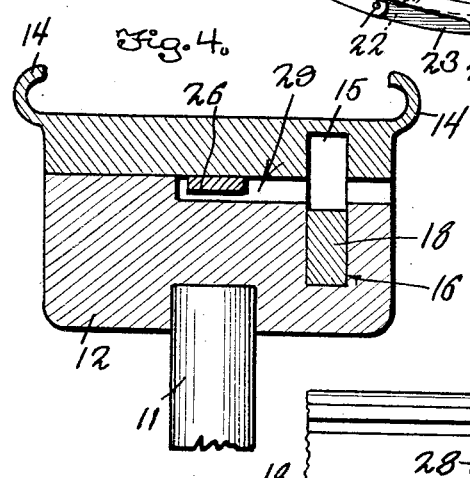
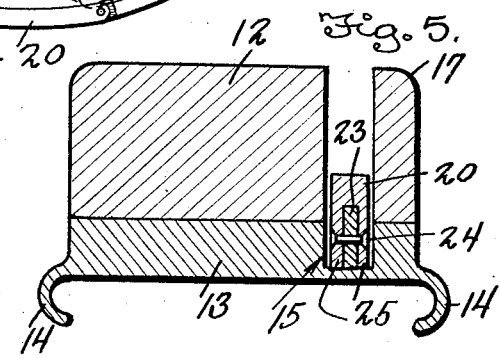
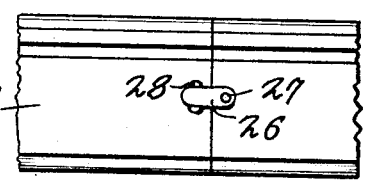
Earl E. Campbell
Inventor Patented Dec. 6, 1932

1,890,028

UNITED STATES PATENT OFFICE

EARL E. CAMPBELL, OF GILLETTE, WYOMING, ASSIGNOR OF ONE-HALF TO A. J. McCLELLAND, OF GILLETTE, WYOMING

DEMOUNTABLE RIM

Application filed January 21, 1930. Serial No. 422,404.

This invention relates generally to new and useful improvements in wheels and rims therefor and appertains more specifically to novel and simplified means for mounting a demountable rim on a wheel.

The primary object of the present invention is to provide means whereby a rim of the character stated may be easily and quickly placed on or removed from a wheel with the expenditure of a minimum amount of time.

Another important object of the present invention is to provide a rim of the character stated which may be mounted on a wheel without the use of the usual nuts and bolts commonly employed in connection with rims of this nature.

Another object of the present invention is the provision of an improved and novel wheel having incorporated therewith means for locking the rim thereon.

Another object of the present invention is the provision of a demountable rim of the character stated wherein the proper positioning thereof on the wheel will at all times be assured for the reason that the locking means employed for securing the rim to the wheel cannot be moved into locking position unless the rim is so properly positioned.

Another object of the present invention is to provide an improved demountable wheel rim together with new and novel means for retaining the same in position on the wheel.

A further object of the present invention is to provide a demountable rim of the character stated which, while simple in construction, is nevertheless strong, sturdy and durable, practical and efficient in its application, and well designed for the purposes for which it is intended.

With these and numerous other objects in view, the invention resides in the novel construction, combination and arrangement of parts to be more fully hereinafter described, illustrated in the accompanying drawings and more particularly pointed out in the appended claim.

In the drawings forming a part of this application wherein like characters of reference denote corresponding parts throughout the several views:

Figure 3 is a side view of the means for retaining the rim in position on the wheel.

Figure 4 is a sectional view on line 4—4 of Figure 3.

Figure 5 is a sectional view on line 5—5 of Figure 1.

Figure 6 is a bottom plan view of a portion of the rim showing the means for securing the split ends thereof together.

Figure 1:
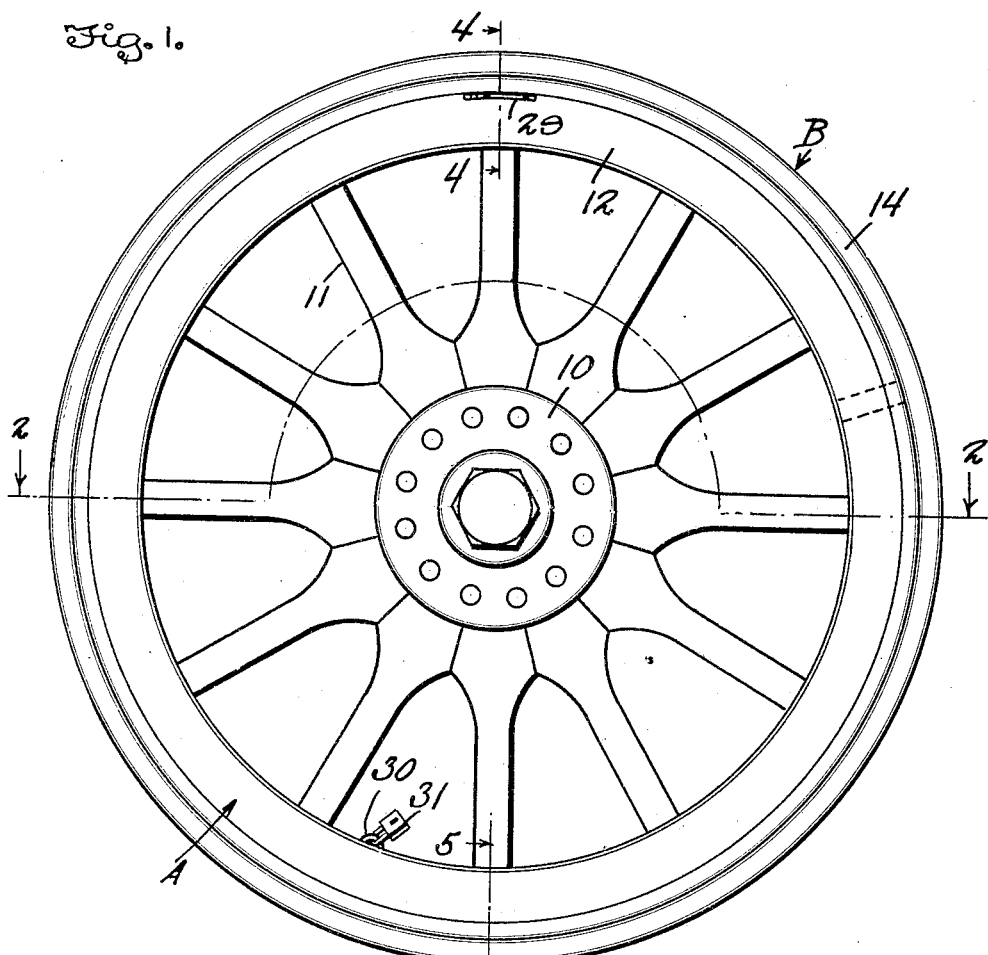
Figure 1 is a side view of a demountable rim and wheel construction in accordance with the present invention.

Reference now being had more particularly to the accompanying drawings, wherein for the purpose of illustration has been disclosed a preferred embodiment of the present invention, the letter A generally indicates the improved wheel, and B the improved rim removably associated therewith.

The wheel A comprises in its construction a hub 10, from which radiate the usual spokes 11 carrying at their outer ends the felly 12 adapted to removably receive thereon the split rim B which includes the base plate 13 provided at each end thereof with the usual inturned annular tire engaging flanges 14.

It will be noted that the periphery of the felly 12 of the wheel A and the inner surface of the base plate 13 of the rim B are provided with the registering circumferentially extending channels or grooves 15 and 16, the groove 16 being somewhat deeper than the groove 15 for a purpose to be more fully set forth hereinafter. The felly 12 is also provided at one point with the elongated slot 17 communicating with the channel 16.

Arranged to be fitted within the peripheral channel 16 in the felly 12 is a split resilient band 18 and pivoted as at 19 to one end of the band is one end of the operating lever 20, the outer or opposite end thereof being somewhat reduced to provide the terminal lip 21. Pivoted as at 22 to the other end of the band 18 is one end of a connecting link 23, the outer end of said link being pivoted as at 24 between the spaced ears 25 formed on the operating lever 20 intermediate the ends thereof.

Figure 2:
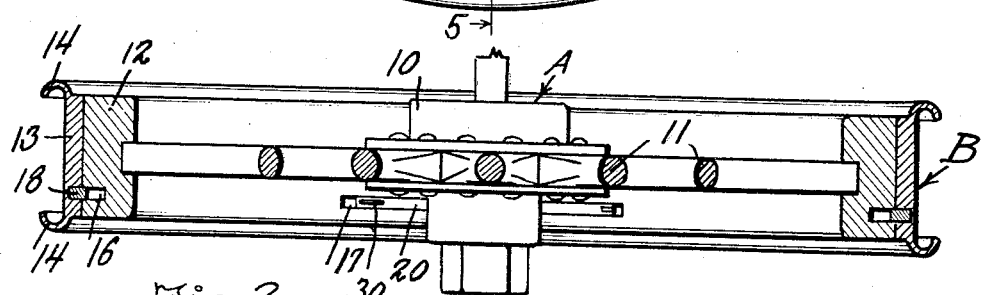
Figure 2 is a sectional view on line 2—2 of Figure 1.

When placing the band 18 within the channel 16 in the felly 12, the same is so positioned that the operating lever 20 will be accommodated within the elongated opening 17 as is clearly shown in Figure 2.

When it is desired to place the rim B on the wheel A, it is first necessary that the band 18 be contracted so that it will be completely contained within the channel 16 in the felly 12 and this may be readily accomplished by simply pulling the lever 20 inwardly. When the band 18 is wholly contained within the channel 16 as shown in Figure 4, the rim B can be easily placed in proper position around the felly 12 after which the band is expanded by forcing the operating lever 20 outwardly whereby the said band will be moved into the channel 15 in the base plate 13 of the rim but as this channel 15 is not as deep as the channel 16 in the felly 12, a portion of the band 18 will still be received within the channel 16 in the felly 12, as shown in Figure 2 with the result that the said rim will be securely locked in place on the said felly.

It will be noted that the rim B is of the split type and in order to secure the split ends thereof together, there is provided a latch 26 pivoted as at 27 to the under surface of the rim adjacent one end thereof, said latch 26 adapted to engage a keeper 28 secured to the under surface of the rim adjacent the opposite end thereof. The felly 12 of the wheel is also provided at one point with a transverse recess 29 within which is received the latch 26 and keeper 28 when the rim is positioned on the felly, it being noted that the recess 29 extends from the forward face of the felly inwardly to a point substantially one-half the width thereof.

For the purpose of locking the operating lever 20 against accidental movement after the rim has been secured in position, there is carried by the inner surface of the band 18 a staple 30 which is adapted to pass through a slot in the lip 21 of the operating lever 20 when the band 18 is expanded to retain the rim in position and a suitable padlock 31 can then be engaged with the staple 30 whereby the operating lever 20 will be securely locked against accidental movement.

It will be readily appreciated from the foregoing that there has been provided a novel and simplified demountable rim which will accomplish all of the objects and perform all of the functions claimed and wherein the use of the ordinary nuts and bolts commonly used to retain rims of this nature in position are eliminated. Thus, a great amount of time and trouble will be saved in the removing and replacing of the rim as there will be no nuts to be lost or threads of bolts to be stripped. Also, the proper position of the rim on the felly is at all times assured inasmuch as the band 18 cannot be expanded to lock the rim in place unless the rim has first been properly positioned so that the channels 15 and 16 are in alinement with one another.

While there has been shown and described one embodiment of the present invention, it is to be understood that the same is susceptible of modifications in various particulars and it is to be understood that any such modifications as properly fall within the scope of the appended claim may be resorted to without departing from or sacrificing the spirit of the invention.

What is claimed is:

In a device of the class described, the combination with the felly of a wheel having a peripheral channel on its outer face between the sides thereof, of a rim removably fitted on the outer face of the felly having a peripheral channel on its inner face between its sides, for registration with the channel in the felly when the rim is fitted thereon, said felly being further provided with a slot communicating with the channel therein and defining a pocket and being spaced from the side edges of said felly, the channel in the felly being of a greater depth than the channel in the rim, and means for removably locking the rim on the felly including a resilient split band adapted to circle the felly and to be received within the channel therein, a toggle connecting the ends of the band together including an operating lever, the toggle and operating lever being received within the pocket when the operating lever is in its closed position and swung bodily outwardly of said slot when said operating lever is in its open position, said band being adapted to be wholly contained within the channel in the felly, when it is desired to remove or replace the rim on the felly and being received in both of said channels when it is desired to lock the rim on the felly.

In testimony whereof I affix my signature.

EARL E. CAMPBELL.